(12) United States Patent
Drewnowski et al.

(10) Patent No.: US 11,773,015 B2
(45) Date of Patent: Oct. 3, 2023

(54) HIGH THROUGHPUT ELECTRO-THERMAL POLING

(71) Applicant: CORNING INCORPORATED, Corning, NY (US)

(72) Inventors: Christopher William Drewnowski, Corning, NY (US); Michael Thomas Gallagher, Painted Post, NY (US); Charles Thomas McLaren, Elmira, NY (US); Nicholas James Smith, Port Matilda, PA (US); Nicholas Ryan Wheeler, Corning, NY (US); Thomas Michael Zajicek, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 185 days.

(21) Appl. No.: 17/159,247

(22) Filed: Jan. 27, 2021

(65) Prior Publication Data

US 2021/0238086 A1    Aug. 5, 2021

Related U.S. Application Data

(60) Provisional application No. 62/969,011, filed on Jan. 31, 2020.

(51) Int. Cl.
*C03C 23/00*      (2006.01)

(52) U.S. Cl.
CPC .......... *C03C 23/009* (2013.01); *C03C 23/007* (2013.01)

(58) Field of Classification Search
CPC ... C03C 23/009; C03C 23/007; C03C 23/008; C03C 21/00; C03C 23/00
See application file for complete search history.

(56) References Cited

U.S. PATENT DOCUMENTS 3,393,987 A * 7/1968 Plumat .................... C03B 18/14
                                                    65/92
3,632,321 A * 1/1972 Plumat .................... C03C 21/00
                                                    205/769
(Continued)

FOREIGN PATENT DOCUMENTS

| CN | 105842767 A | 8/2016 | |
| DE | 102004011009 A1 * | 9/2005 | ........... C03C 21/007 |

(Continued)

OTHER PUBLICATIONS

He et al., "Thermal Poling of Soda-Lime Silica Glass with Nonblocking Electrodes—Part 2: Effects on Mechanical and Mechanochemical Properties", J. Am. Ceram. Soc., vol. 99, No. 4, 2016, pp. 1231-1238.

(Continued)

*Primary Examiner* — Galen H Hauth
*Assistant Examiner* — Steven S Lee
(74) *Attorney, Agent, or Firm* — Svetlana Z. Short

(57) ABSTRACT

An apparatus for continuous electro-thermal poling of glass or glass ceramic material, includes a lower support conveying and contacting electrode structure, an upper contacting electrode structure positioned above the lower support structure, and one or more DC bias voltage sources connected to one or both of the upper contacting structure and the lower support structure. A process for continuous electro-thermal poling of glass or glass ceramic sheets or substrates includes heating the sheet or substrate, feeding the sheet or substrate continuously or continually, while applying a DC voltage bias, and cooling the sheet or substrate to within 0-30° C. of ambient temperature.

9 Claims, 5 Drawing Sheets

(56) References Cited

U.S. PATENT DOCUMENTS

| | | | |
|---|---|---|---|
| 3,681,040 A * | 8/1972 | Pierre-Dit-Mery | C03B 18/14 65/30.14 |
| 3,811,855 A * | 5/1974 | Carlson | H01J 29/24 422/186.05 |
| 3,879,183 A * | 4/1975 | Carlson | C03C 21/00 427/535 |
| RE29,464 E * | 11/1977 | Loukes | C03C 21/001 65/182.3 |
| 4,824,458 A * | 4/1989 | Ettori | H01T 19/00 65/30.13 |
| 5,648,172 A | 7/1997 | Jousse et al. | |
| 8,991,216 B2 * | 3/2015 | Gallagher | C03B 35/185 65/370.1 |
| 9,016,093 B2 | 4/2015 | Ahmed et al. | |
| 2004/0013385 A1* | 1/2004 | Brennand | C03C 23/009 65/425 |
| 2004/0138044 A1 | 7/2004 | Sakaguchi et al. | |
| 2005/0067104 A1* | 3/2005 | Takahara | C11D 11/0047 156/345.54 |
| 2007/0190752 A1* | 8/2007 | Faris | C03C 3/06 438/476 |
| 2013/0323468 A1* | 12/2013 | Myers | C03C 15/00 428/143 |
| 2014/0120311 A1* | 5/2014 | Smith | C03C 19/00 428/141 |
| 2016/0122227 A1* | 5/2016 | Mimoun | C03B 27/012 428/212 |
| 2016/0159684 A1 | 6/2016 | Smith | |
| 2016/0340226 A1 | 11/2016 | Dutta et al. | |
| 2017/0305787 A1* | 10/2017 | Gomez | C03C 21/002 |
| 2018/0327306 A1* | 11/2018 | Paraillous | C03C 3/087 |

FOREIGN PATENT DOCUMENTS

| | | | | |
|---|---|---|---|---|
| EP | 0001837 A2 * | 11/1978 | | C03C 23/009 |
| EP | 0001837 A2 | 5/1979 | | |
| EP | 0555663 A2 | 8/1993 | | |
| EP | 3263535 A1 | 1/2018 | | |
| FR | 2660649 A1 * | 10/1991 | | C03C 23/00 |
| GB | 1416477 A * | 12/1975 | | C03C 21/001 |

OTHER PUBLICATIONS

Ikutame et al., "Low-Temperature Fabrication of Fine Structures on Glass Using Electrical Nanoimprint and Chemical Etching", Journal of Applied Physics, vol. 114, 2013, pp. 083514-1-083514-5.

Lepicard et al., "Micro-Structuring the Surface Reactivity of a Borosilicate Glass Via Thermal Poling", Chemical Physics Letters, 2016, 20 pages.

Lipovskii et al., "Imprinting Phase/Amplitude Patterns in Glasses With Thermal Poling", Solid State Ionics, vol. 181, 2010, pp. 849-855.

Sakai et al., "Selective Deposition of SiO2 on Ion Conductive Area of Soda-lime Glass Surface", Scientific Reports, 2016, pp. 1-7.

International Search Report and Written Opinion of the International Searching Authority; PCT/US2021/015043; dated May 10, 2021; 9 pages; European Patent Office.

* cited by examiner

HIGH THROUGHPUT ELECTRO-THERMAL POLING

CROSS-REFERENCE TO RELATED APPLICATIONS

This application claims the benefit of priority under 35 U.S.C. § 119 of U.S. Provisional Application No. 62/969,011, filed Jan. 31, 2020, the content of which is incorporated herein by reference in its entirety.

BACKGROUND

This disclosure relates to electro-thermal poling of glass, and particularly to processes and apparatuses for high-throughput electro-thermal poling of glass.

The mechanism of thermal poling of glass or glass ceramic materials is the result of ionic conduction, which is temperature dependent. A DC voltage applied across a glass or glass ceramic which is at elevated temperature provides the driving force for mobile ionic charge migration toward opposing electrodes—i.e., cations migrate toward the cathode(s). The thermal poling process can be applied to glass and glass-ceramic materials which have a composition containing network-modifying ions. A predominant effect of poling is the creation of an alkali-ion depletion layer within the glass surface nearest the anode. The alkali ion depletion layer has a modified composition compared to the bulk composition, by which certain properties in the layer can be enhanced or obtained.

Potential enhanced properties include optical, chemical, physical and bioactive properties at the surface and/or near-surface layers. Glass properties are altered by electro-chemical effects that occur within a glass containing network modifying ions when exposed to an externally applied electrical potential. Glass properties vary considerably depending on composition. Demonstrations of thermal poling have proved beneficial on a variety of properties on a wide range of parent glass compositions.

Prior art has demonstrated the advantages of thermal poling. However, all of these trials have been on a laboratory scale that is time consuming and has not been applied to bulk manufacturing amounts of glass.

SUMMARY

Disclosed herein is an apparatus for continuous electro-thermal poling of glass or glass ceramic material, includes a lower support conveying and contacting electrode structure, an upper contacting electrode structure positioned above the lower support structure, and one or more DC bias voltage sources connected to one or both of the upper contacting structure and the lower support structure.

Also disclosed is a process for continuous electro-thermal poling of glass or glass ceramic sheets or substrates includes heating the sheet or substrate, feeding the sheet or substrate continuously or continually, while applying a DC voltage bias, and cooling the sheet or substrate to within 0-30° C. of ambient temperature.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Reference will now be made in detail to various embodiment(s).

Figure 1:
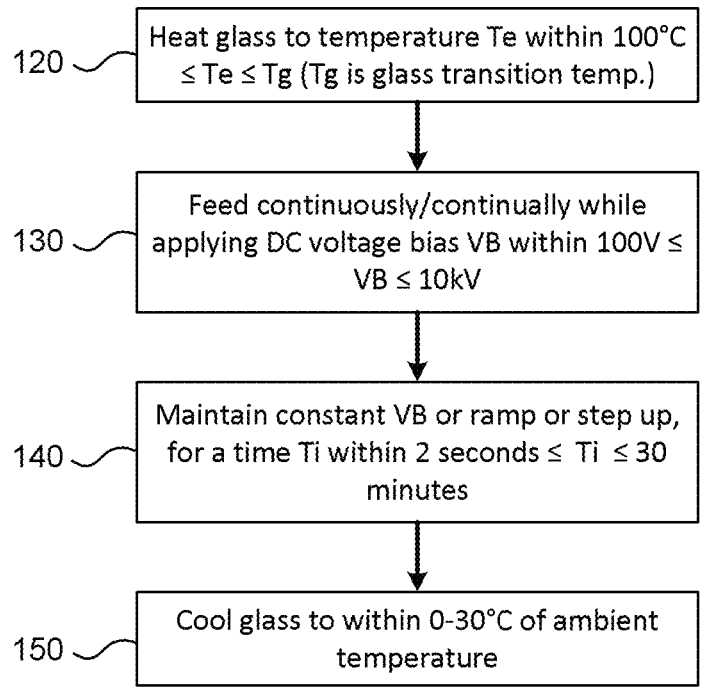
FIG. 1 is a flow chart showing aspects of a process according to an embodiment of the present disclosure.

As shown in FIG. 1, a continuous thermal poling process 100 according to an embodiment of the present disclosure comprises the step 120 of heating the glass or other sheet or substrate to a temperature Te within the range of from 100° C. to Tg (where Tg is the glass transition temperature; the step 130 of feeding the sheet or substrate continuously or continually while applying a DC voltage bias VB within the range of from 100V to 10 kV; the step 140 of maintaining a constant VB, or ramping or stepping up VB (and optionally, thereafter maintaining a constant VB, and in any case applying the VB, whether constant or ramped or both, for a time Ti within the range of from 2 seconds to 30 minutes; and the step 150 of cooling the sheet or substrate to within 0-30° C. of ambient temperature.

Step 120 can optionally be conducted in continuous fashion. Steps 130 and 140 can optionally be conducted in an inert or low-reactivity atmosphere. Step 130 can optionally include applying voltage by contact with the substrate or sheet. Step 150 can optionally be performed during the time Ti of step 140. Step 150, particularly if not performed during the time Ti of step 140, is desirably performed within 2 seconds to 5 minutes. The step 150 desirably includes cooling to within 0-10° C. of ambient temperature. The DC voltage bias applied in steps 130 and 140 may additionally have an time varying voltage superimposed upon the DC voltage bias.

The high throughput thermal poling process utilizing the steps described above with reference to FIG. 1 may be accomplished by utilizing any of a variety of equipment designs. Examples of equipment designs are described below, but the embodiments shown are not to be understood as the only possible implementations of the disclosed process.

Figure 2:
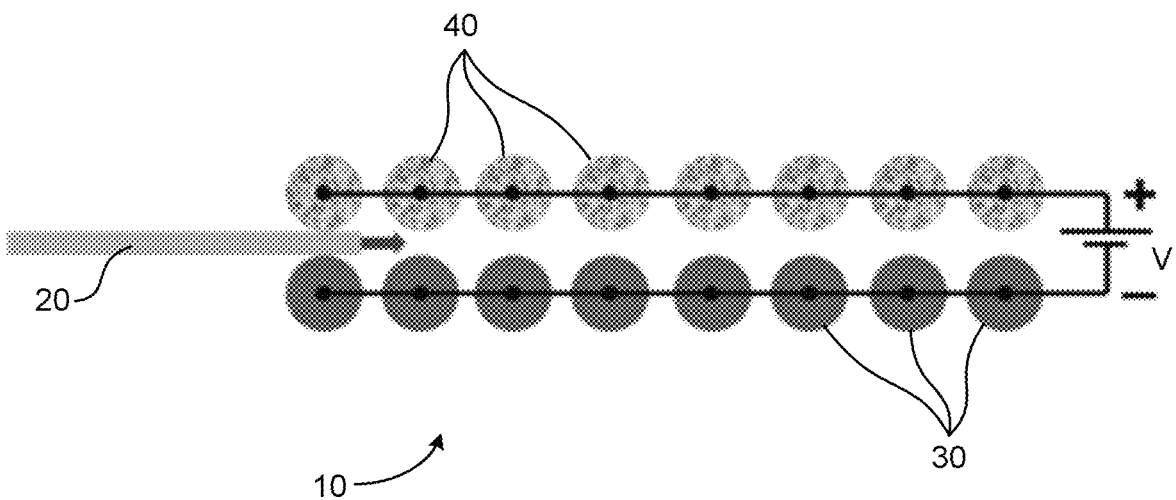
FIG. 2 is a diagrammatic side view of a substrate or sheet and an apparatus for continuous poling of the substrate or sheet according to an embodiment of the present disclosure.

With reference to FIG. 2, the first example embodiment of an apparatus 10 useful for practicing the process of the present disclosure comprises of a series of aligned bottom rollers 30 and aligned top rollers 40, with each respective series of rollers connected electrically in parallel to a voltage source V, ensuring that the voltage applied to the substrate or sheet 20 is the same across each contact point between the substrate or sheet 20 and rollers 30, 40. As one example using DC voltage, the top rollers 40 will have the positive bias while the bottom rollers 30 will have the negative bias to ground.

A preheated sheet or substrate 20 of glass or glass ceramic is passed between the rollers 30, 40 as shown in the figure. The glass will be thermally poled in a line contact area across the sheet between the rollers of opposite voltage bias. The rollers will pull the sheet of glass along the system to the next rollers for a cumulative residence time during the thermal poling process at a continuous linear velocity.

Figure 3:
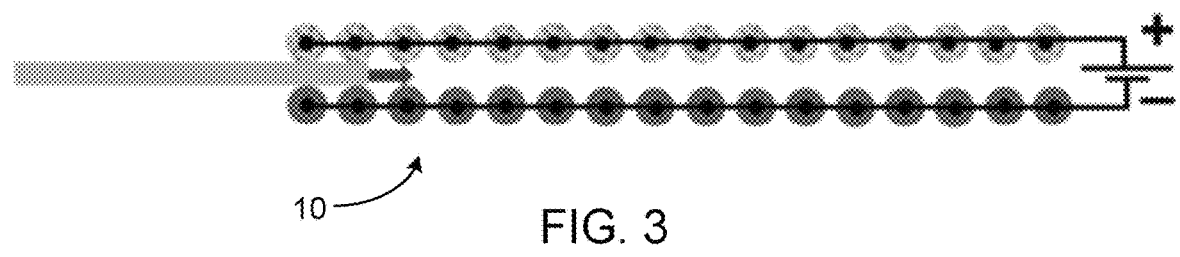
FIG. 3 is a diagrammatic side view of an apparatus for continuous poling according to another embodiment of the present disclosure.

The rollers can optionally have varying roller diameters and pitches between rollers to increase or decrease the thermal poling residence time that the sheet or substrate 20 experiences in contact with the rollers, which function as electrodes in the poling process. Some other variations of the electrodes and rollers are shown in additional figures. A simple variation of an apparatus 10 having smaller roller diameters is shown in FIG. 3.

Figure 4:
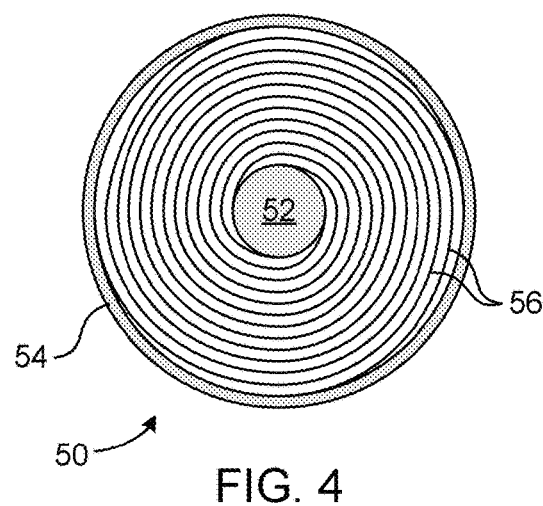
FIG. 4 is a diagrammatic side view of one embodiment of a roller useful in embodiments of the present disclosure.

The rollers of any of the present embodiments can be compliant to the substrate or sheet by either structural or material methods, or by means of compliant suspension of the rollers. Some examples of complaint rollers for use with glass are discussed, for instance, in U.S. Pat. Nos. 8,991, 216B2 and 9,016,093B2. An example of a compliant roller 50, in this case produced by a 3D laser powder bed fusion printing process, is shown in diagrammatic side view in FIG. 4. A hub or axle 52 supports a rim 54 by multiple interleaved spiral spokes 56 which act during use as compliant springs.

Figure 5:
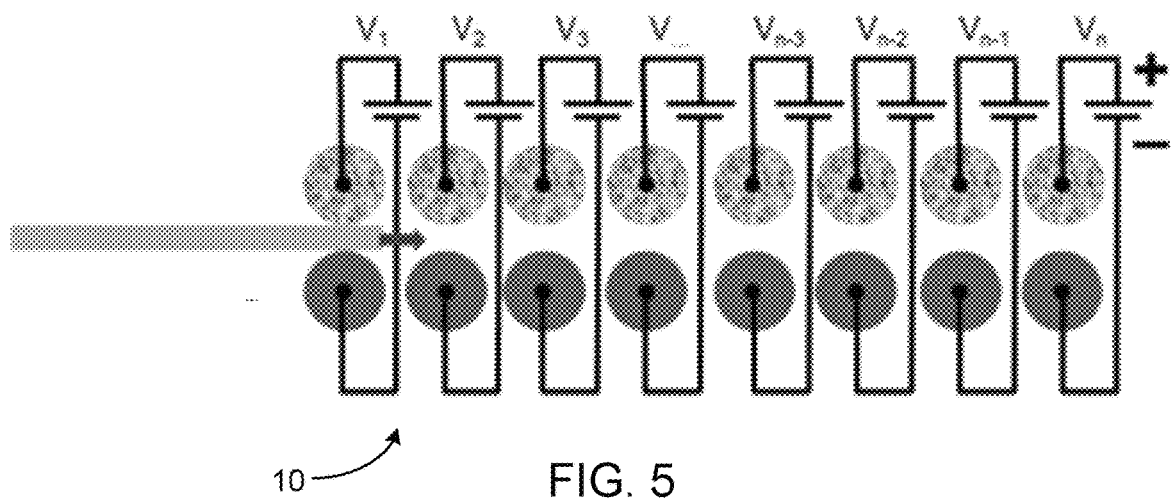
FIG. 5 is a diagrammatic side view of an apparatus for continuous poling according to still another embodiment of the present disclosure.

With reference to FIG. 5, according to other embodiments of the apparatus 10 of the present disclosure, the applied voltage may vary independently at each roller, with voltage sources $V_1$ to $V_n$ corresponding to n total rollers with an applied voltage. For instance, the applied voltage can be increased along the line of rollers, inducing more current flow through the sheet or substrate and further enhancing the effects of thermal poling as the sheet or substrate passes. The number of steps taken in applied voltage can be configured by the number of rollers in the system anywhere from a single roller and resulting single voltage step up to any number n of rollers, as shown in the figure.

Figure 6:
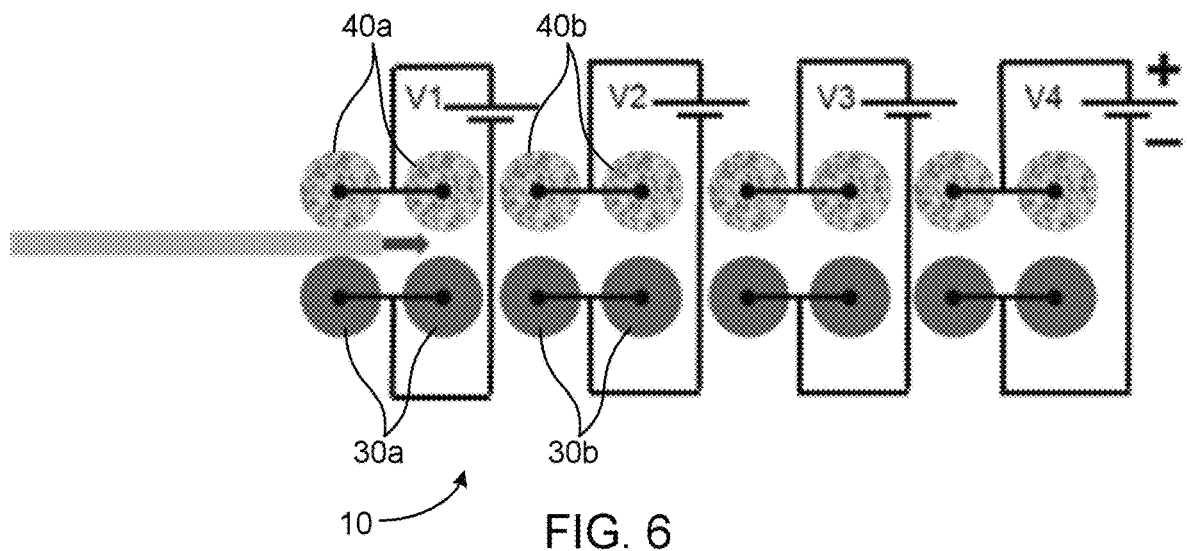
FIG. 6 is a diagrammatic side view of an apparatus for continuous poling according to yet another embodiment of the present disclosure.

The voltage can also be applied by many other configurations, such as pairs of rollers (or more than pairs) that are tied to the same voltage. This concept is shown in the apparatus 10 of FIG. 6, with the top set of rollers arranged in pairs 40a, 40b, still being the anode side and the bottom rollers arranged in pairs 30a, 30b, being the cathode side, for example. Instead of all the rollers being electrically connected in parallel, the rollers are separated into pairs and connected to voltage sources V1-V4, of increasing voltage, left to right, as the sheet or substrate passes along the poling system apparatus 10.

Figure 7:
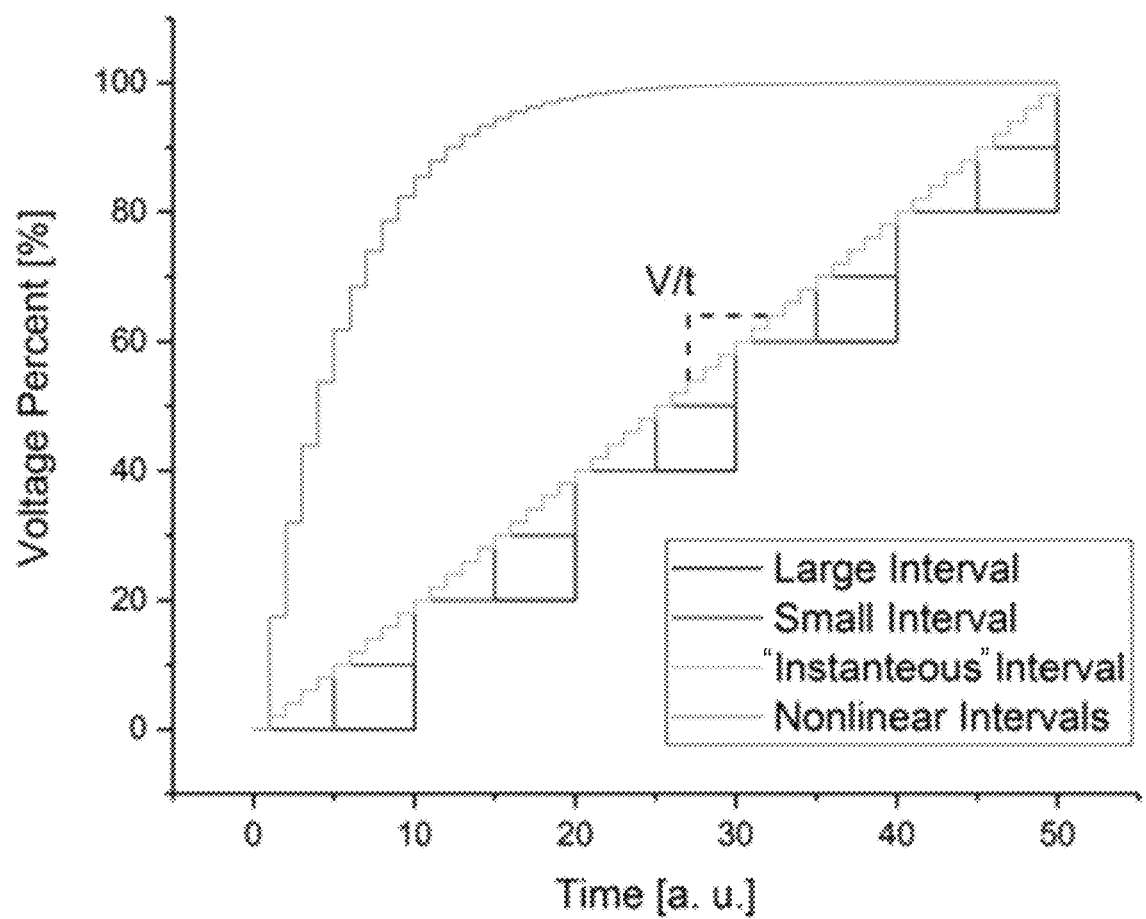
FIG. 7 is a graph of various types of change in applied voltage over time useful in various embodiment of the present disclosure.

Controlling the applied voltage of the rollers independently (or in pairs or larger groupings that a still smaller than the total) allows for voltage ramping as illustrated in FIG. 7. Voltage ramping is desirable to avoid dielectric breakdown in the substrate or sheet and allows the process to respond to the field produced in the substrate by ion migration, allowing the substrate itself to respond with further ion migration. As shown in the figure, the increasing applied voltage can increase in either linear or nonlinear fashion. Linear steps produce a fixed rate of voltage increase over the time that the glass makes contact with the rollers or poling system. A nonlinear increase in voltage can decrease the required time for poling and optimize the poling process in terms of manufacturing time. Therefore, a nonlinear ramp can be desirable to reduce poling time while maximizing the depth (thickness) of the modified region of the substrate or sheet.

Figure 8:
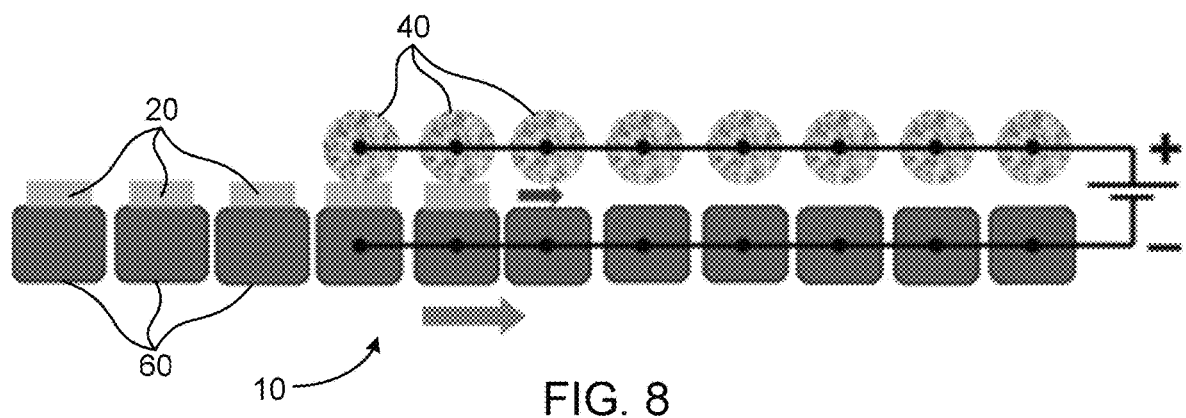
FIG. 8 is a diagrammatic side view of an apparatus for continuous poling according to yet another embodiment of the present disclosure.

With reference to FIG. 8, another variation of a high throughput poling system apparatus 10 consists of electrodes with flat upper surfaces, such as in the form of trays 60, which carry substrates or sheets 20, and which travel on a conveyor system and make contact with a voltage source or sources as they pass. For example, trays 60 can make contact with ground and become the cathode, replacing the bottom set of rollers shown in earlier embodiments. The single set of upper rollers 40 of this embodiment would desirably still be the anode side that thermally poles the sheets or substrates as they pass under. The cathode trays 60 will be travel at the same linear velocity as the surfaces of the rollers 40. The number of rollers will be dependent on the effective poling time for the formation of a desired ion depletion layer thickness.

The surface of the rollers can be either smooth or textured. Smooth rollers will make uniform contact with the glass and create a uniform depletion layer thickness where electrical contact is made with the glass. Textured roller can be used to create differential thermal poling areas on the glass as well as creating surface structural features via electrical imprinting.

Figure 9:
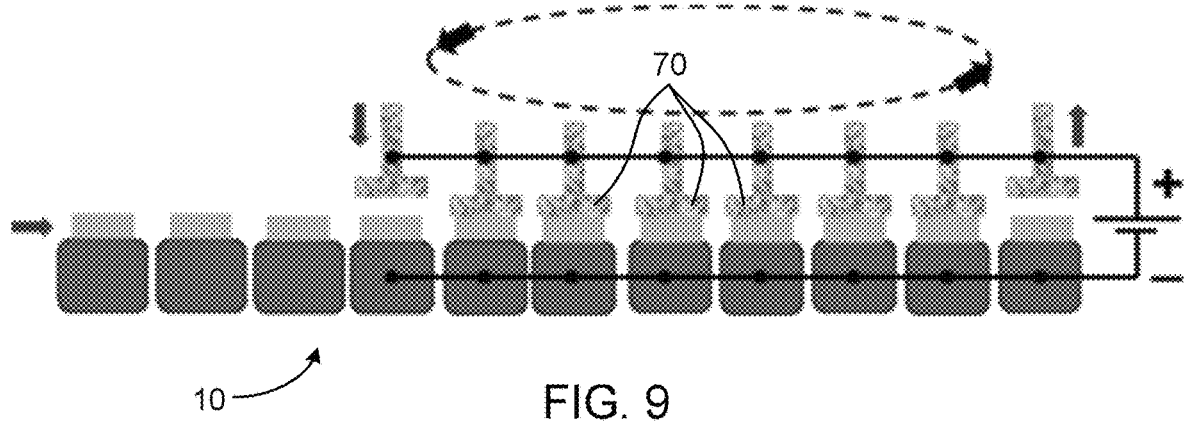
FIG. 9 is a diagrammatic side view of an apparatus for continuous poling according to yet another embodiment of the present disclosure.

With reference to FIG. 9, still another embodiment of an apparatus 10 removes the rollers from the system and replaces them with respective pneumatic arms or other mechanism(s) that lower respective flat-surfaced (flat bottom-surfaced) upper electrodes 70 to make contact with the glass sitting on trays or other conveyor structure. The example shown in FIG. 9 has the pressing arm as the anode and the trays or other conveyor structure as the cathode. The respective anodes 70 travel on a rotating turret or the like to match with the motion of the cathode conveyor or trays to make constant contact with the substrate or sheet during poling. Once the desired thermal poling process has completed the respective anodes are raised and rotated back to the starting position to repeat.

This embodiment is useful for when longer contact times are needed for the desired poling process to occur. Again, the anode arm surface can be flat as mentioned to make uniform contact, or textured to make differential contact, if desired. The pressing anode and the cathode tray can also have 3D surface shapes to enable thermal poling of substrates or sheets having curved surfaces.

Figure 10:
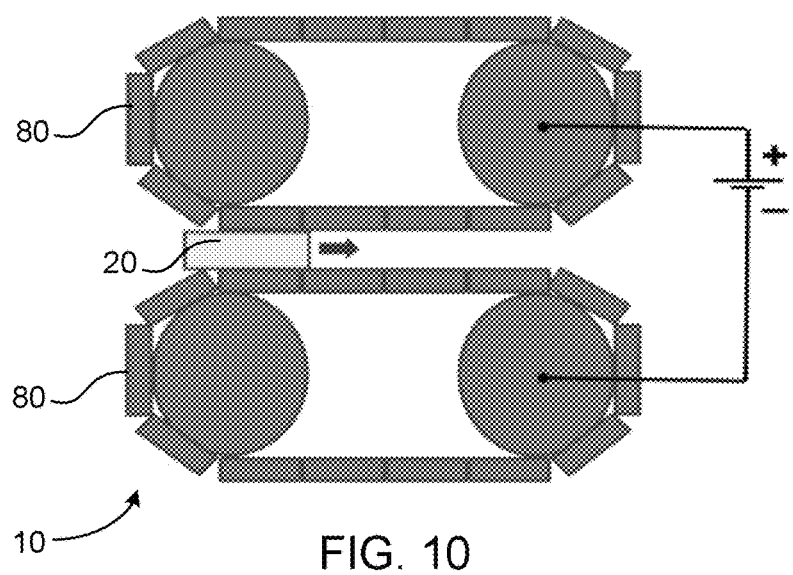
FIG. 10 is a diagrammatic side view of an apparatus for continuous poling according to yet another embodiment of the present disclosure.

With reference to FIG. 10, according to another embodiment apparatus 10 which is particularly useful if longer poling times are needed, conveyor belts 80 could be set up with a poling voltage across them. The substrate or sheet is then fed through as depicted in the figure. The top set of rollers and conveyor structure could be the anode, with the bottom set the cathode, or vice versa. Increase in voltage steps, if desired, can be accomplished by setting multiple such conveyors in series provided with increasing voltages.

The apparatuses described herein can be used for feeding continuous sheets or single article substrates continuously into the process. The electrode fixtures can be held by electrically insulating materials such as refractories to prevent heat loss and electrical shorts in the poling circuit for safety.

Figure 11A:
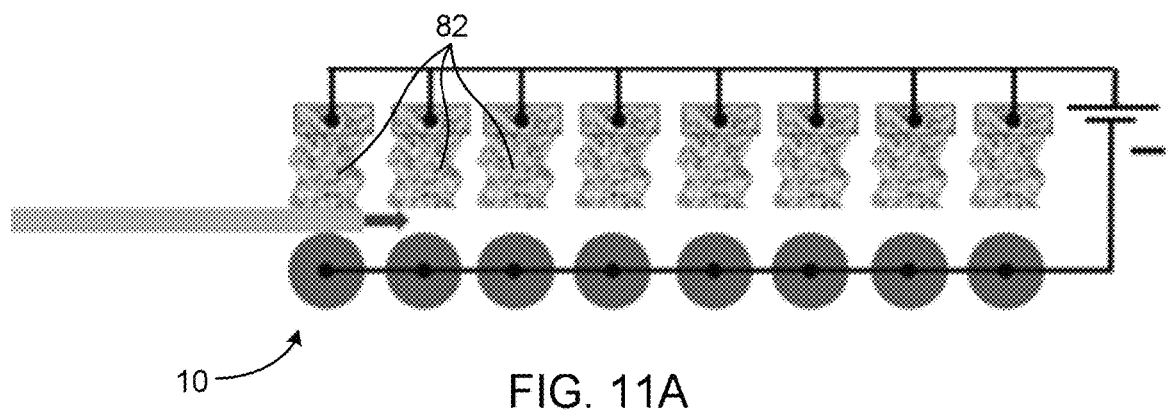
FIGS. 11A and 11B are diagrammatic side views of an apparatuses for continuous poling according to two example embodiments of the present disclosure employing brushes.
Figure 11B:
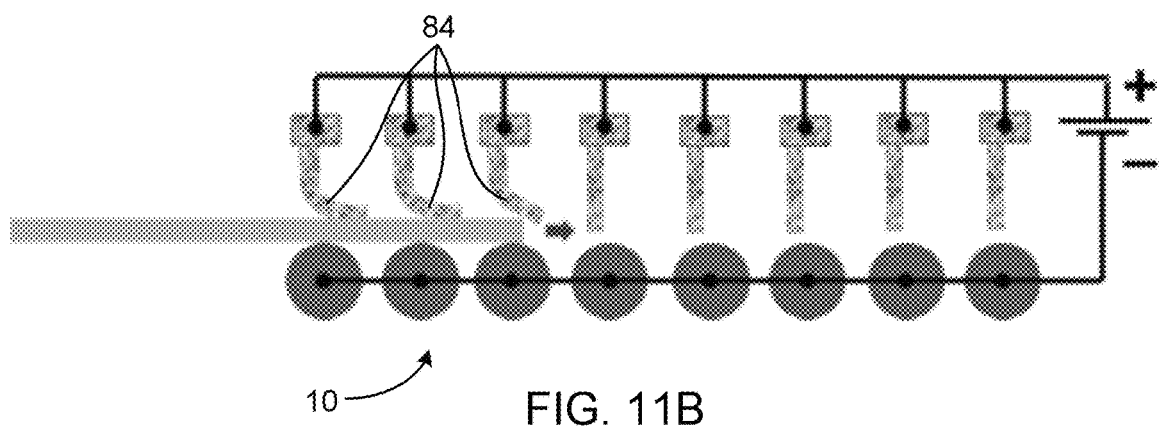

With reference to FIGS. 11A and 11B, additional embodiments of an apparatus 10 can employ flexible contact electrodes, such as end-contact brush electrodes 82 or side-contact brush electrodes 84.

The electrode materials used can be either ion-blocking or non-blocking. Ion-blocking electrodes prevent the migration of mobile ions from the glass into the electrodes/environment and vice versa. Non-blocking electrodes allow for the migration of mobile ions across the electrode glass interface and potentially with the environment.

Thermal poling methods and apparatuses of the present disclosure have the ability to selectively alter glass composition and surface topography depending on electrode contact area which can be controlled or varied by patterning. The electrode could be patterned using machine tooling, additive manufacturing or lithography techniques. Thermal poling has the ability to pole an article of glass at once instead of rastering across it such as laser ablation or without masking for chemical etching. The main mechanism of thermal poling is ionic migration which is driven by electric field lines and therefore can create higher resolution features than thermal pressing and most laser ablation and chemical etching techniques.

It will be apparent to those skilled in the art that various modifications and variations can be made without departing from the spirit or scope of the disclosure.

What is claimed is:

1. An apparatus for continuous electro-thermal poling of glass or glass ceramic material, the apparatus comprising:
    a lower support conveyor and contacting electrode structure, wherein the lower support conveyor and contacting electrode structure comprises a plurality of moveable trays;
    an upper contacting electrode structure positioned above the lower support conveyor and contacting electrode structure; and
    one or more DC bias voltage sources connected to one or both of the upper contacting electrode structure and the lower support conveyor and contacting electrode structure.

2. The apparatus according to claim 1 wherein the lower support conveyor and contacting electrode structure comprises a lower conveyor belt.

3. The apparatus according to claim 1 wherein the upper contacting electrode structure comprises a plurality of upper rollers.

4. The apparatus according to claim 1 wherein the upper contacting electrode structure comprises a plurality of upper flat contacting structures.

5. The apparatus according to claim 1 wherein the upper contacting electrode structure comprises an upper conveyor.

6. The apparatus according to claim 1 wherein the upper contacting electrode structure comprises a flexible contacting structure.

7. The apparatus according to claim 6 wherein the flexible contacting structure comprises a contacting brush.

8. A process for continuous electro-thermal poling a sheet or substrate of glass or glass ceramic material, the process comprising:
    heating the sheet or substrate to a temperature Te within the range of from 100° C. to Tg, where Tg is the glass transition temperature of the material of the sheet or substrate;
    feeding the sheet or substrate continuously or continually using an apparatus while applying a DC voltage bias VB within the range of from 100V to 10 kV;
    applying the VB, whether constant or ramped or both, for a time Ti within the range of from 2 seconds to 30 minutes; and
    cooling the sheet or substrate to within 0-30° C. of ambient temperature;
    wherein the apparatus comprises:
    a lower support conveyor and contacting electrode structure, wherein the lower support conveyor and contacting electrode structure comprises a plurality of moveable trays;
    an upper contacting electrode structure positioned above the lower support conveyor and contacting electrode structure; and
    one or more DC bias voltage sources connected to one or both of the upper contacting electrode structure and the lower support conveyor and contacting electrode structure.

9. An apparatus for continuous electro-thermal poling of glass or glass ceramic material, the apparatus comprising:
    a lower support conveyor and contacting electrode structure;
    an upper contacting electrode structure positioned above the lower support conveyor and contacting electrode structure, wherein the upper contacting electrode structure comprises a plurality of flat electrodes and a plurality of pressing arms, each of the plurality of flat electrodes attached to one of the plurality of pressing arms; and
    one or more DC bias voltage sources connected to one or both of the upper contacting electrode structure and the lower support conveyor and contacting electrode structure.

* * * * *